July 10, 1962 — L. PÉRAS — 3,043,404

SHOCK ABSORBERS OF VEHICLES

Filed June 15, 1959

INVENTOR
Lucien Péras

United States Patent Office 3,043,404
Patented July 10, 1962

3,043,404
SHOCK ABSORBERS OF VEHICLES
Lucien Péras, Billancourt, France, assignor to Regie Nationale des Usines Renault, Billancourt, France
Filed June 15, 1959, Ser. No. 820,461
Claims priority, application France July 18, 1958
3 Claims. (Cl. 188—88)

This invention relates in general to new and useful improvements in shock absorbers, and more particularly to improvements in shock absorbers of the type including a closed cylinder having fluid therein and a piston within the cylinder reciprocable against the resistance of the fluid within the cylinder.

It is well known that as the force applied on a piston of a closed cylinder type of shock absorber increases, the velocity of the fluid passing through the piston must also increase. However, while the velocity of the fluid as compared to the force on the piston does not increase as rapidly at low piston speeds, at higher piston speeds, the velocity increases much more rapidly than the force. In view of this, it is the primary object of this invention to provide a novel piston and valve assembly wherein the valve assembly is provided with fluid passages of sufficient size to permit flow through the piston at low piston speeds and the valve being of a construction wherein it is openable by excessive fluid pressure to increase the area of fluid flow to compensate for the increased ratio of fluid flow to piston force.

Another object of this invention is to provide an extremely simple single valve disk type of valve for use in conjunction with a piston of a closed cylinder type of shock absorber, the valve disk being resilient and of a construction wherein the fluid passage area thereof is automatically increased as the piston speed increases and the necessary fluid velocity also increases.

A further object of this invention is to provide a novel piston and valve assembly for use in a closed cylinder type of fluid shock absorber, the valve assembly including a single valve disk held in place by a washer, which washer normally closes fluid passages in the valve disk, and the washer being replaceable to vary the characteristics of the valve disk.

With the above and other objects in view that will hereinafter appear, the nature of the invention will be more clearly understood by reference to the following detailed description, the appended claims and the several views illustrated in the accompanying drawings:

Figure 1:
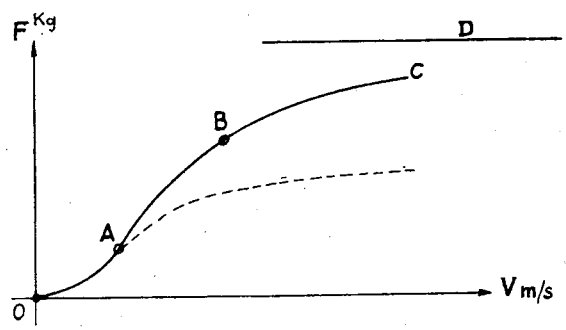
FIGURE 1 is a diagram showing the braking force of a piston plotted as a function of the piston linear speed.

This invention relates to shock absorbers, notably of the type applicable to automotive vehicles and is concerned more particularly to improvements brought to these devices, whereby a law of shock absorption having the form illustrated in the diagram of FIG. 1 of the attached drawing may be obtained in the operation of the shock absorber, this diagram plotting the braking force as a function of the piston linear speed, the shock absorber action varying according as it is subjected to tractive or compressive forces.

This law is characterized by:

Its parabolic trend from O to A at moderate speeds such as vertical oscillations of the vehicle body in relation to the road surface;

Its substantially linear trend at average speeds close to those corresponding to the rebound of wheels in relation to the road surface;

Its decreasing slope at higher speeds, the value of F tending asymptotically to a limit with D being the asymptote towards which the curve ABC tends.

The solid line curve represents the function of the shock absorber upon expansion while the dotted line curve represents the function of the shock absorber in compression.

In most hydraulic shock absorbers the desired law of shock absorption involves the simultaneous, cascade or alternate action of a plurality of movable or deformable members such as valves and the like.

More particularly, if the shock absorber is of the asymmetric adjustment type, certain components thereof will become operative only in case of shock (when the shock absorber operates under compression) whereas other members operate only under rebound conditions (expansion) in the head of the shock absorber, or, as a rule, in those portions of the shock absorber which are compulsorily traversed by the damping fluid responsive in one direction to compression and in the other direction to expansion.

The improvements constituting the subject-matter of this invention are based on the utilization of the deformations of a single valve member so mounted on the piston of the hydraulic shock absorber as to control both laws governing the operation of the shock absorber under road impact and rebound conditions and provide the desired evolution of the damping law, this valve member being adapted properly to combine a fluid flow taking place through one or more passages having a constant cross-sectional area, with a fluid flow taking place gradually through passages of gradually increasing cross-sectional area uncovered by the valve member as it is deformed or displaced, said last-mentioned fluid flow being caused by the pressure differential to which the valve member is subjected.

In order to afford a clearer understanding of this invention and of the manner in which the same may be carried out in the practice, reference will now be made to FIGS. 2 to 4 of the accompanying drawing illustrating diagrammatically by way of example axial longitudinal sections of a damping piston of shock absorber which is constructed according to the teachings of this invention.

Figure 2:
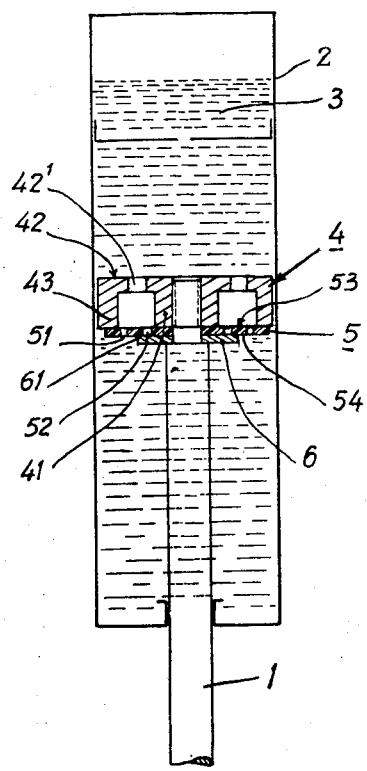
FIGURE 2 is a vertical sectional view taken through a conventional cylinder type shock absorber utilizing the novel piston and valve assembly which is the subject of this invention.

FIG. 2 illustrates a preferred form of embodiment of a single-valve damping piston. The cylinder body, piston-rod and the dividing partition of the compensation chamber of the shock absorber are shown only in diagrammatical form.

It will be assumed that the control rod 1 of the shock absorber is attached to the unsprung portions and that the body 2 is secured to the sprung portion of the vehicle and has an expansion chamber 3 disposed in its upper portion.

The head of the shock absorber comprises essentially a piston 4 provided with a valve member 5 and a washer 6.

The piston 4 comprises a central boss or like projection 41, a bottom 42 formed with perforations $42^1$ providing a relatively large total passage area, and an annular skirt 43.

The valve member 5 consists in this case of a flexible and deformable disc of suitable resilient material which is clamped between the piston boss 41 and a rigid washer 6 by the rod 1 shouldered to this end and formed with a threaded portion engaging a tapped hole in the boss, for example.

In addition to its central aperture, the resilient valve member 5 is formed with one or more orifices 51 of relatively small aggregate cross-sectional area, which are uncovered permanently, and with one or more series of orifices 52 normally closed by the washer 6.

The piston of the shock absorber operates as follows:

When the piston travels in the shock-absorber body at a relatively low speed in either direction, the damping fluid flows mainly through the series of orifices 51 without forcing the valve member 5 away from its bearing members 41 and 6, and under these conditions the motion-retarding law governing the operation of the shock absorber has a parabolic trend.

Figure 3:
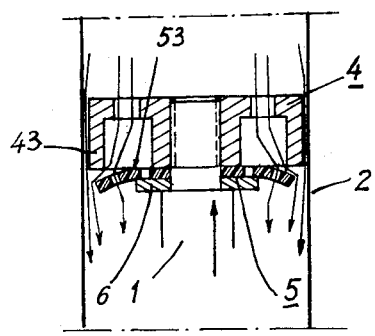
FIGURES 3 and 4 are enlarged fragmentary schematic views showing the operation of the valve under compression and expansion flow of fluid, respectively.

From a predetermined velocity of depression of the rod in the compression direction (or in the case of a shock), the valve member 5 becomes responsive to an overpressure acting upon its inner face 53 and is therefore gradually lifted off its seat 43, thereby uncovering an additional annular space as shown in FIG. 3; thus, the motion retarding law governing the operation of the shock absorber is modified, its characteristic is less inclined.

When the rod 1 is depressed at relatively high velocities in the same direction (compression), the flow of fluid through this annular space becomes preponderant, the resilient valve member acting as a real discharge valve.

Figure 4:
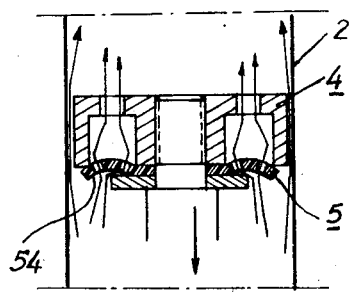

In the expansion and rebound condition, the shock absorber operates in a similar manner: above a certain rate of expansion of the rod 1, the overpressure exerted in this case against the outer face 54 of valve member 5 (which assists in pressing the latter against its seat 43) causes a deformation to take place in the valve member whereby the latter moves somewhat away from the edge 61 of washer 6, thus uncovering partially the series of holes 52 as shown in FIG. 4. Under these conditions, the fluid flows through the two sets of orifices 51 and 52.

At higher expansoin rate, the fluid flow through this set of orifices 52 becomes preponderant, thus tending to reduce the braking action.

In these examples, the braking characteristics can be shaped as a function of the rate of travel of the piston and the obtaining of specific different reactions to shock and rebound by providing different bearing diameters or contours of the washer 6.

I claim:

1. In a shock absorber of the type having a piston carried by a piston rod for reciprocation in a sealed cylinder, a novel piston and valve assembly comprising a piston having a head, a depending boss and a depending skirt, said boss and said skirt combining to define an annular fluid passage beneath said piston head, said piston head having perforations therethrough and opening into said annular fluid passages through said piston head, a resilient valve disk underlying said piston, said piston rod being secured to said boss in depending relation and carrying said valve disk, a washer carried by said piston rod and clamping a central portion of said valve disk against said boss, said washer extending radially outwardly of said boss and overlapping a portion of said annular fluid passage, said valve disk having a peripheral portion underlying and normally engaging said skirt, said valve disk having an outer set of fluid passages disposed radially intermediate the periphery of said washer and said skirt for the passage of fluid through said valve disk at low piston speeds, and said valve disk having an inner set of fluid passages disposed in overlying relation to said washer, the resiliency of said valve disk allowing said valve disk to deflect downwardly away from said skirt upon the rapid upward movement of said piston to provide an additional fluid passage of a cross-section depending upon the piston speed to pass fluid through said piston, and the resiliency of said valve disk allowing said valve disk to deflect upwardly into said annular fluid passage upon the rapid downward movement of said piston to move that portion of said valve disk carrying said inner fluid passages away from said washer with the resultant fluid flow through said inner fluid passages.

2. In a shock absorber of the type having a piston carried by a piston rod for reciprocation in a sealed cylinder, a novel piston and valve assembly comprising a piston having a head, a depending boss and a depending skirt, said boss and said skirt combining to define an annular fluid passage beneath said piston head, said piston head having perforations therethrough and opening into said annular fluid passages through said piston head, a resilient valve disk underlying said piston, said piston rod being secured to said boss in depending relation and carrying said valve disk, a washer carried by said piston rod and clamping a central portion of said valve disk against said boss, said washer extending radially outwardly of said boss and overlapping a portion of said annular fluid passage, said valve disk having a peripheral portion underlying and normally engaging said skirt, said valve disk having an outer set of fluid passages disposed radially intermediate the periphery of said washer and said skirt for the passage of fluid through said valve disk at low piston speeds, and said valve disk having an inner set of fluid passages disposed in overlying relation to said washer, and the resiliency of said valve disk allowing said valve disk to deflect upwardly into said annular fluid passage upon the rapid downward movement of said piston to move that portion of said valve disk carrying said inner fluid passages away from said washer with the resultant fluid flow through said inner fluid passages.

3. The piston and valve assembly of claim 1 wherein said washer is replaceable to vary the operating characteristics of said valve disk.

References Cited in the file of this patent

UNITED STATES PATENTS

| 2,111,192 | Padgett | Mar. 15, 1938 |
| 2,320,697 | Binder | June 1, 1943 |
| 2,782,877 | Crabtree | Feb. 26, 1957 |
| 2,821,268 | Carbon | Jan. 28, 1958 |

FOREIGN PATENTS

| 1,068,224 | France | Feb. 3, 1954 |
| 1,100,323 | France | Apr. 6, 1955 |
| 1,112,598 | France | Nov. 16, 1955 |